(12) United States Patent
Sood et al.

(10) Patent No.: US 11,764,985 B2
(45) Date of Patent: Sep. 19, 2023

(54) AUGMENTED INTELLIGENCE BASED VIRTUAL MEETING USER EXPERIENCE IMPROVEMENT

(71) Applicant: International Business Machines Corporation, Armonk, NY (US)

(72) Inventors: Siddhartha Sood, Indirapuram (IN); Sanket Jain, Gurgaon (IN); Ajay Kumar Sharma, Greater Noida (IN); Mohammad Kafee Uddin, New Delhi (IN); Manoj Kumar Joshi, Greater Noida West (IN)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 17/231,066

(22) Filed: Apr. 15, 2021

(65) Prior Publication Data
US 2022/0337443 A1    Oct. 20, 2022

(51) Int. Cl.
*G06F 15/16* (2006.01)
*H04L 12/18* (2006.01)
(Continued)

(52) U.S. Cl.
CPC ........ *H04L 12/1831* (2013.01); *G06F 16/735* (2019.01); *G06F 16/739* (2019.01); *G06V 20/47* (2022.01); *H04L 12/1822* (2013.01)

(58) Field of Classification Search
CPC ............ H04L 12/1831; H04L 12/1822; G06F 16/735; G06F 16/739
(Continued)

(56) References Cited

U.S. PATENT DOCUMENTS 7,308,476 B2    12/2007    Mannaru
8,739,046 B2     5/2014    Sloyer
(Continued)

FOREIGN PATENT DOCUMENTS

| CN | 105340255 A | 2/2016 |
|----|-------------|--------|
| CN | 107210034 A | 9/2017 |
| WO | 2012088230 A1 | 6/2012 |

OTHER PUBLICATIONS

"Patent Cooperation Treaty PCT International Search Report", Applicant's File Reference: F22WI603, International Application No. PCT/CN2022/079553, International Filing Date: Mar. 7, 2022, dated May 26, 2022, 10 pages.
(Continued)

*Primary Examiner* — Lan Dai T Truong
(74) *Attorney, Agent, or Firm* — Andre L. Adkins

(57) ABSTRACT

In an approach for improving the virtual meeting user experience, a processor detects a user disengaging from a virtual meeting having at least two participants for a pre-set period of time or for a pre-set percentage of a total allotted time of a pre-scheduled virtual meeting. A processor retrieves data from a database. A processor prepares a summary that is tailored to a profile of the user and that covers a portion of the virtual meeting during which the user was disengaged. A processor detects the user reconnecting to the virtual meeting. A processor determines whether the user will review the summary before rejoining the virtual meeting. Responsive to determining the user will review the summary before rejoining the virtual meeting, a processor prompts the user with a set of default user preferences to review the summary. A processor outputs the summary to the user.

20 Claims, 5 Drawing Sheets

(51) Int. Cl.
- *G06F 16/735* (2019.01)
- *G06F 16/738* (2019.01)
- *G06V 20/40* (2022.01)

(58) Field of Classification Search
USPC .......................................... 709/204, 202, 203
See application file for complete search history.

(56) References Cited

U.S. PATENT DOCUMENTS

| | | | |
|---|---|---|---|
| 9,400,833 | B2 | 7/2016 | Thapliyal |
| 11,379,799 | B1* | 7/2022 | Budkiewicz ............ H04L 67/60 |
| 2006/0031290 | A1 | 2/2006 | Mannaru |
| 2012/0284640 | A1 | 11/2012 | Sloyer |
| 2013/0290434 | A1* | 10/2013 | Bank ...................... G06Q 10/10 |
| | | | 709/204 |
| 2016/0285929 | A1* | 9/2016 | Oganezov ............. H04L 65/765 |
| 2017/0208105 | A1 | 7/2017 | Katekar |
| 2020/0286472 | A1 | 9/2020 | Newendorp |
| 2022/0139383 | A1* | 5/2022 | Rose ..................... H04L 51/212 |
| | | | 704/232 |
| 2022/0224554 | A1* | 7/2022 | Hassan ............... H04L 12/1827 |

OTHER PUBLICATIONS

Anonymous et al., "Intelligent Search: Video summarization using machine learning", Microsoft Bing Blogs, Aug. 28, 2018, 5 Pages.
Authors et al . . . : Disclosed Anonymously, "During group conversation using available communication medium, if any invitee joins the conversation late, relay/replay the conversation to the user till the point he has missed, so that he is in context and participate in decision making", An IP.com Prior Art Database Technical Disclosure, IP.com No. IPCOM000234679D, IP.com Electronic Publication Date: Jan. 28, 2014, 3 Pages.
Authors et al.: Disclosed Anonymously, "Personalized Meeting Summary Based on Participant Engagement Rate", An IP.com Prior Art Database Technical Disclosure, IP.com No. IPCOM000261382D, IP.com Electronic Publication Date: Feb. 27, 2020, 4 Pages.
Ghafoor et al., "Egocentric Video Summarization Based on People Interaction Using Deep Learning", Hindawi, Mathematical Problems in Engineering, vol. 2018, Article ID: 7586417, Nov. 29, 2018, 13 Pages.
Gizis, Alex, "Zoom Dropping Calls and Other Issues", Connectify, Inc., Sep. 16, 2020, 4 Pages.
Gizis, Alex, "Zoom Meeting Keeps Disconnecting on Android", Connectify, Inc., Mar. 18, 2020, 3 Pages.
Hyvärinen et al., "Independent Component Analysis: Algorithms and Applications", Neural Networks Research Centre, Helsinki University of Technology, Finland, 2000, 31 Pages.
Jain, Divya, "Leveraging AI and Deep Learning for Video Summarization", Medium, Adobe Tech Blog, May 16, 2019, 5 Pages.
Liu et al., "Content Extraction and Summarization of Instructional Videos", 2006 International Conference on Image Processing, Atlanta, GA, USA, Oct. 8-11, 2006, 4 Pages.
Liu et al., "Entity Summarization with User Feedback", The Semantic Web, ESWC 2020, LNCS 12123, pp. 376-392, Springer Nature Switzerland AG, May 2020, 17 Pages.
Liu et al., "Text summarization with TensorFlow", Google AI Blog, Aug. 24, 2016, 3 Pages.
Magalhães, Davi, "Improving the interaction in Zoom using Machine Learning", Medium, UX Collective, May 1, 2020, 8 Pages.
Tseng et al., "Personalized Video Summary Using Visual Semantic Annotations and Automatic Speech Transcriptions", 2002 IEEE Workshop on Multimedia Signal Processing, St.Thomas, VI, USA, Dec. 9-11, 2002, 4 Pages.

* cited by examiner

AUGMENTED INTELLIGENCE BASED VIRTUAL MEETING USER EXPERIENCE IMPROVEMENT

BACKGROUND OF THE INVENTION

The present invention relates generally to the field of data processing, and more particularly to an augmented intelligence-based system and method to improve the virtual meeting user experience.

Augmented intelligence is an alternative conceptualization of artificial intelligence (AI) which focuses on AI's assistive role in advancing human capabilities. Augmented intelligence uses machine learning and deep learning to enhance human intelligence rather than to replace it. Augmented intelligence enhances human intelligence by improving human decision-making and, by extension, the actions taken in response to the improved decisions.

Machine learning describes AI's ability to learn and improve from experience without additional programming. Natural language processing, which allows a computer to identify human language, is an example of machine learning. Deep learning describes an AI process that mimics the human brain's ability to process data and to see patterns.

The key difference between augmented intelligence and AI is one of autonomy. Augmented intelligence handles large amounts of data that would otherwise overwhelm a human decision-maker and removes factors that would cause data to be colored or misinterpreted, such as bias, fatigue, or distraction. Augmented intelligence analyzes the data, identifies patterns, and reports those patterns to users, thereafter, allowing human intelligence to take over. Augmented intelligence allows a system to learn from its users about the user's individual preferences and expectations, providing for a tailored and personalized experience.

An example of augmented intelligence is the viewing of recommendations provided by a streaming video service. An augmented intelligence algorithm analyzes a user's viewing habits and recommends additional viewings based on those habits. It is then up to the user to decide whether to act on the recommendations. Augmented intelligence also has applications in any industry that mines big data for patterns and predictive indicators. Examples include, but are not limited to, online stores using data analytics to predict customer preferences; virtual customer service assistance based on natural language processing; political think tanks using big data analytics to identify undecided voters; medical analysis of case files to identify efficient treatment options; factory automation overseen by human employees; predictive maintenance of factory equipment based on past data; mobile video games using surrounding environments and data to create augmented reality events, superimposing computer-generated images on smartphone camera screens; airplane and drone autopilot systems; and investment and financial applications monitoring and identifying stock market patterns.

AI, on the other hand, operates without any human assistance. An example of AI is an email spam filter or an AI-powered search suggestion.

SUMMARY

Aspects of an embodiment of the present invention disclose a method, computer program product, and computer system for improving the virtual meeting user experience. A processor detects a user disengaging from a virtual meeting having at least two or more participants for a pre-set period of time or for a pre-set percentage of a total allotted time of a pre-scheduled virtual meeting. A processor retrieves a first set of data regarding the user, a second set of data regarding the at least two participants of the virtual meeting, and a third set of data regarding a relationship between the user and the at least two participants of the virtual meeting from a database. A processor prepares a summary that is tailored to a profile of the user and that covers a portion of the virtual meeting during which the user was disengaged. A processor detects the user reconnecting to the virtual meeting. A processor determines whether the user will review the summary before rejoining the virtual meeting based on a pre-set user preference, a decision made by the user, or a machine-driven recommendation. Responsive to determining the user will review the summary before rejoining the virtual meeting, a processor prompts the user with a set of default user preferences to review the summary. A processor outputs the summary to the user.

In some aspects of an embodiment of the present invention, subsequent to outputting the summary to the user, a processor compares the summary to a replay of a full recording of the virtual meeting A processor requests feedback from the user. A processor receives the feedback from the user. A processor improves the accuracy of a plurality of future summaries prepared using reinforcement learning. A processor stores the feedback from the user in the database.

In some aspects of an embodiment of the present invention, a processor identifies the two or more participants of the virtual meeting. A processor assigns a weightage to the two or more participants of the virtual meeting based on a first set of factors. A processor ranks the two or more participants of the virtual meeting based on the weightage the two or more participants were assigned.

In some aspects of an embodiment of the present invention, subsequent to ranking the at least two participants of the virtual meeting based on the weightage the at least two participants were assigned, a processor extracts a plurality of audio frames, a plurality of video frames, and a plurality of audio and video frames from the portion of the virtual meeting during which the user was disengaged. A processor identifies a context of the plurality of audio frames, of the plurality of video frames, and of the plurality of audio and video frames in order to understand the one or more topics of the virtual meeting.

In some aspects of an embodiment of the present invention, subsequent to identifying the context of the plurality of audio frames, of the plurality of video frames, and of the plurality of audio and video frames in order to understand the one or more topics of the virtual meeting, a processor selects a subset of the plurality of audio frames, a subset of the plurality of video frames, and a subset of the plurality of audio and video frames based on whether the plurality of audio frames, the plurality of video frames, and the plurality of audio and video frames relate to the profile of the user. A processor ranks the subset of the plurality of audio frames, the subset of the plurality of video frames, and the subset of the plurality of audio and video frames using an algorithmic approach or a second set of factors. A processor merges the subset of the plurality of audio frames, the subset of the plurality of video frames, and the subset of the plurality of audio and video frames that ranked above an algorithmically determined threshold value. A processor prepares a consolidated summary of the subset of the plurality of audio frames that ranked above the algorithmically determined threshold value, a consolidated summary of the subset of the plurality of video frames that ranked above the algorithmically determined threshold value, and a consolidated summary of the subset of the plurality of audio and video frames that ranked above the algorithmically determined threshold value.

In some aspects of an embodiment of the present invention, subsequent to preparing a consolidated summary of the subset of the plurality of audio frames that ranked above the algorithmically determined threshold value, of the subset of the plurality of video frames that ranked above the algorithmically determined threshold value, and of the subset of the plurality of audio and video frames that ranked above the algorithmically determined threshold value, a processor converts the consolidated summary to one or more sentences using an extractive text summarization algorithm. A processor applies speaker diarisation. A processor ranks the one or more sentences based on a third set of factors. A processor retains a subset of the one or more sentences that rank above a second threshold value that is based on a second pre-set user preference or a second machine-driven recommendation.

In some aspects of an embodiment of the present invention, subsequent to retaining the subset of the one or more sentences that rank above the second threshold value that is based on the second pre-set user preference or the second machine-driven recommendation, a processor identifies one or more keywords in the subset of the one or more sentences. A processor assigns a weightage to the one or more keywords in the subset of the one or more sentences based on the one or more keywords relatedness to the one or more topics of the virtual meeting and based on the one or more keywords relatedness to the at least two participants of the virtual meeting. A processor tags the subset of the one or more sentences with the one or more keywords.

In some aspects of an embodiment of the present invention, subsequent to tagging the subset of the one or more sentences with the one or more keywords, a processor prepares a global ranking incorporating the at least two participants, the one or more keywords, and the subset of the one or more sentences. A processor prepares the summary tailored to a profile of the user based on the global ranking.

In some aspects of an embodiment of the present invention, the first set of data regarding the user, the second set of data regarding the at least two participants of the virtual meeting, and the third set of data regarding the relationship between the user and the at least two participants of the virtual meeting collected from the database include a profile created by the user; a corporate profile of the user; a calendar of the user; one or more profiles created by the at least two participants of the virtual meeting; the corporate profile of the at least two participants of the virtual meeting; the calendar of the at least two participants of the virtual meeting; one or more presentation tools used by the at least two participants of the virtual meeting; and data from one or more prior virtual meetings the user hosted, participated in, or attended.

In some aspects of an embodiment of the present invention, a processor captures the time during the virtual meeting when the user reconnected. A processor calculates a total duration of time the user was disengaged from the virtual meeting.

In some aspects of an embodiment of the present invention, the set of default user preferences to review the summary include a language preference, a viewing mode preference, an audio preference, and a subtitles preference.

In some aspects of an embodiment of the present invention, a processor extracts a first set of one or more key entities from the summary and a second set of one or more key entities from the full recording of the virtual meeting. A processor matches the first set of one or more key entities from the summary with the second set of one or more key entities from the full recording of the virtual meeting.

In some aspects of an embodiment of the present invention, a processor provides the user with three or more selections representing the satisfactory level of the user, wherein the three or more selections include not satisfactory, neutral, and satisfactory.

In some aspects of an embodiment of the present invention, the first set of factors includes a role of the at least two participants in the virtual meeting, the role of the at least two participants in a corporation, and the relatedness of the at least two participants to the user who disengaged from the virtual meeting.

In some aspects of an embodiment of the present invention, the algorithmically determined threshold value is dynamic and is set in line with a training data set.

In some aspects of an embodiment of the present invention, the second set of factors includes whether the frames contain a name of the user who was disengaged from the virtual meeting, whether the ranking of the at least two participants, the relatedness of the at least two participants to the user who disengaged from the virtual meeting, based on the technology interest of the user, based on the domain expertise of the user, or based on historical analysis.

In some aspects of an embodiment of the present invention, a processor finds a point of change between the at least two participants in the plurality of audio frames. A processor groups together a segment of speech based on a characteristic of the at least two participants.

In some aspects of an embodiment of the present invention, the third set of factors includes the role of the at least two participants of the virtual meeting and the relatedness of the one or more sentences to the one or more topics of the virtual meeting.

DETAILED DESCRIPTION

Figure 1:
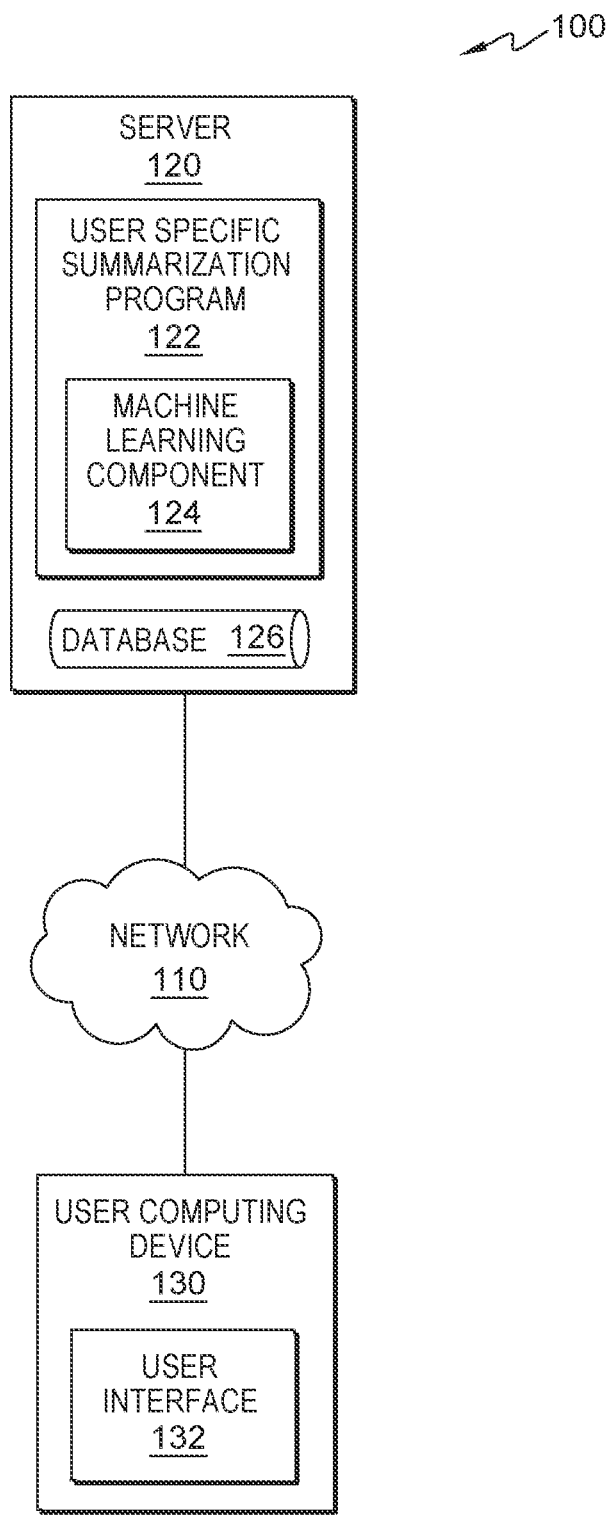
FIG. 1 is a functional block diagram illustrating a distributed data processing environment, in accordance with an embodiment of the present invention.

Embodiments of the present invention recognize that problems can arise during a meeting on a virtual collaboration server tool. For example, a technical issue may cause a user to get disconnected from the meeting. Due to the disconnect, the user may miss important information, such as the host's or another participant's input on an issue or topic, the host's response to another participant's question or concern, a course of action taken by a participant, or expected takeaways and action items meant for the user who was disconnected from the meeting.

Embodiments of the present invention provide an augmented intelligence-based system and method to improve the virtual meeting user experience. Embodiments of the present invention propose to prepare a summary that is tailored to the profile of the user who disengages from a meeting on a virtual collaboration server tool and that covers the portion of the meeting during which the user was disengaged.

Embodiments of the present invention detect when a user disengages from the meeting either explicitly or implicitly. After detecting the user's disengagement, embodiments of the present invention apply the concepts of (1) merging and (2) speech-to-text summarization using an extractive text summarization algorithm to audio and/or video frames extracted from the portion of the meeting during which the user was disengaged.

Embodiments of the present invention partition the sentences into homogeneous segments according to the participant's identity using speaker diarisation and identify keywords from the participant's sentences. Embodiments of the present invention assign a weightage to the participants and to the keywords. Embodiments of the present invention prepare a global ranking incorporating the identified and weighted participants, the identified and weighted keywords, and the ranked sentences.

Embodiments of the present invention reduce the sentences to a short summary in either the form of a thirty second video or text one page in length. Embodiments of the present invention tailor the summary to the profile of the user who disengages from the meeting on the virtual collaboration server tool using factors such as the respective user's corporate profile, the hierarchy of the user's corporation, the user's position in the corporation's hierarchy, the user's seniority in the user's corporation, the user's primary job, the user's primary job functions, the user's technology interests, the user's domain expertise, and the user's history of engagement in meetings the user hosted, participated in, or attended. Embodiments of the present invention also consider calculated speech recognition confidence score and intent confidence score as part of the summarization process.

Embodiments of the present invention leverage the weight of the user's relationship with other participants to decide when to prompt the user with the summary once the user has reconnected to the meeting. Embodiments of the present invention provide the user with the option to play back the summary during the meeting or after the meeting. Embodiments of the present invention also provide the user with the option to play the summary with audio, video, captions, or any combination of the three formats.

Embodiments of the present invention gather feedback from the user in order to improve future preparations of summaries.

Implementation of embodiments of the present invention may take a variety of forms, and exemplary implementation details are discussed subsequently with reference to the Figures.

FIG. 1 is a functional block diagram illustrating a distributed data processing environment, generally designated 100, in accordance with an embodiment of the present invention. In the depicted embodiment, distributed data processing environment 100 includes server 120 and user device computing device 130, interconnected over network 110. Distributed data processing environment 100 may include additional servers, computers, computing devices, IoT sensors, and other devices not shown. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

Network 110 operates as a computing network that can be, for example, a telecommunications network, a local area network, a wide area network, such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120, user computing device 130, and other computing devices (not shown) within distributed data processing environment 100.

Server 120 operates to run user specific summarization program 122 and to send and/or store data in database 126. In an embodiment, server 120 can send data from database 126 to user computing device 130. In an embodiment, server 120 can receive data in database 126 from user computing device 130. In one or more embodiments, server 120 can be a standalone computing device, a management server, a web server, a mobile computing device, or any other electronic device or computing system capable of receiving, sending, and processing data. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130 and other computing devices (not shown) within distributed data processing environment 100 via network 110. Server 120 may include internal and external hardware components, as depicted and described in further detail in FIG. 5.

User specific summarization program 122 operates to prepare a summary that is tailored to the profile of the user who disengages from a meeting on a virtual collaboration server tool and that covers the portion of the meeting during which the user was disengaged.

In the depicted embodiment, user specific summarization program 122 contains machine learning component 124. In the depicted embodiment, user specific summarization program 122 is a standalone program. In another embodiment, user specific summarization program 122 may be integrated into another software product, such as a virtual meeting software package. In the depicted embodiment, user specific summarization program 122 resides on server 120. In other embodiments, user specific summarization program 122 may reside on user computing device 130 or on another computing device (not shown), provided that user specific summarization program 122 has access to network 110.

In an embodiment, a user opts-in to user specific summarization program 122 and sets up a user profile with user specific summarization program 122. The setup component of user specific summarization program 122 is depicted and described in further detail with respect to FIG. 2. The operational steps of user specific summarization program 122 are depicted and described in further detail with respect to FIG. 3. The operational steps of machine learning component 124 of user specific summarization program 122 are depicted and described in further detail with respect to FIG. 4.

Database 126 operates as a repository for data received, used, and/or generated by user specific summarization program 122. A database is an organized collection of data. Data includes, but is not limited to, a plurality of user profiles with information input by users during setup about the respective user's corporate profile, the hierarchy of the user's corporation, the user's position in the corporation's hierarchy, the user's seniority in the user's corporation, the user's primary job, the user's primary job functions, the user's technology interests, and the user's domain expertise; data from the present meeting on a virtual collaboration server tool and/or from prior meetings on a virtual collaboration server tool the user hosted, participated in, or attended (i.e., audio frames, video frames, or audio and video frames); user preferences; alert notification preferences; and any other data received, used, and/or generated by user specific summarization program 122.

Database 126 can be implemented with any type of device capable of storing data and configuration files that can be accessed and utilized by server 120, such as a hard disk drive, a database server, or a flash memory. In an embodiment, database 126 is accessed by user specific summarization program 122 to store and/or to access the data. In the depicted embodiment, database 126 resides on server 120. In another embodiment, database 126 may reside on another computing device, server, cloud server, or spread across multiple devices elsewhere (not shown) within distributed data processing environment 100, provided that user specific summarization program 122 has access to database 126.

The present invention may contain various accessible data sources, such as database 126, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. User specific summarization program 122 enables the authorized and secure processing of personal data. Any storage of data in database 126 must be done in compliance with local laws and with the appropriate permissions obtained.

User specific summarization program 122 provides informed consent, with notice of the collection of personal and/or confidential company data, allowing the user to opt-in or opt-out of processing personal and/or confidential company data. Consent can take several forms. Opt-in consent can impose on the user to take an affirmative action before personal and/or confidential company data is processed. Alternatively, opt-out consent can impose on the user to take an affirmative action to prevent the processing of personal and/or confidential company data before personal and/or confidential company data is processed. User specific summarization program 122 provides information regarding personal and/or confidential company data and the nature (e.g., type, scope, purpose, duration, etc.) of the processing. User specific summarization program 122 provides the user with copies of stored personal and/or confidential company data. User specific summarization program 122 allows the correction or completion of incorrect or incomplete personal and/or confidential company data. User specific summarization program 122 allows for the immediate deletion of personal and/or confidential company data.

User computing device 130 operates to run user interface 132 and is associated with a user. In an embodiment, user computing device 130 may be an electronic device, such as a laptop computer, a tablet computer, a netbook computer, a personal computer, a desktop computer, a smart phone, or any programmable electronic device capable of running user interface 132 and communicating (i.e., sending data to and receiving data from) with user specific summarization program 122 via network 110. In the depicted embodiment, user computing device 130 includes an instance of user interface 132. User computing device 130 may include components as described in further detail in FIG. 5.

User interface 132 operates as a local user interface between user specific summarization program 122 on server 120 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from user specific summarization program 122 to a user via network 110. User interface 132 can also display or present alert notifications including information (e.g., graphics, text, and/or sound) sent from user specific summarization program 122 to a user via network 110. In an embodiment, user interface 132 is capable of sending and receiving data (i.e., to and from user specific summarization program 122 via network 110, respectively).

Through user interface 132, a user can opt-in to user specific summarization program 122; create a user profile; input information about the respective user's corporate profile, the hierarchy of the user's corporation, the user's position in the corporation's hierarchy, the user's seniority in the user's corporation, the user's primary job, the user's primary job functions, the user's technology interests, and the user's domain expertise; and set user preferences and alert notification preferences.

A user preference is a setting that can be customized for a particular user. A set of default user preferences are assigned to each user of user specific summarization program 122. A user preference editor can be used to update values to change the default user preferences. User preferences that can be customized include, but are not limited to, general user system settings, specific user profile settings for user specific summarization program 122, alert notification settings, and machine-learned data collection/storage settings. Machine-learned data includes, but is not limited to, data regarding past results of iterations of user specific summarization program 122 and a user's previous response to an alert notification sent by user specific summarization program 122. Machine-learned data comes from user specific summarization program 122 self-learning how to prepare the summary that is tailored to the profile of the user who disengaged from the meeting on the virtual collaboration server tool and that covers the portion of the meeting during which the user disengaged and whether to prompt the user to review the summary before rejoining the meeting. User specific summarization program 122 self-learns by tracking user activity and improves with each iteration of user specific summarization program 122.

Figure 2:
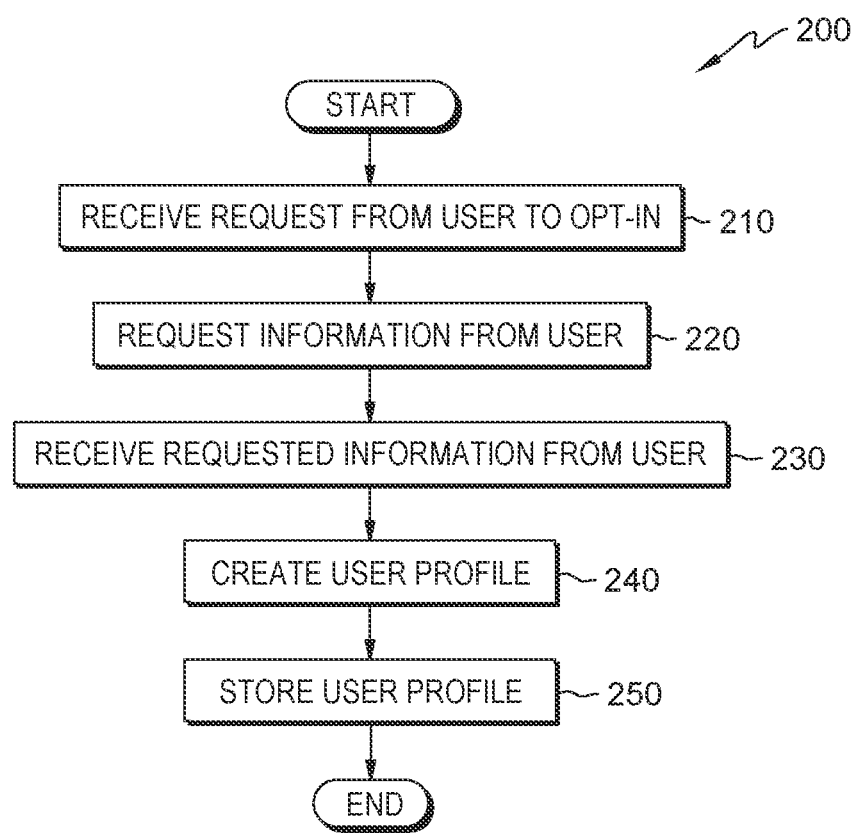
FIG. 2 is a flowchart illustrating the operational steps for a setup component of a user specific summarization program in a distributed data processing environment, such as the one depicted in FIG. 1, in accordance with an embodiment of the present invention.

FIG. 2 is a flowchart, generally designated 200, illustrating the operational steps for a setup component of user specific summarization program 122 in distributed data processing environment 100 of FIG. 1, in accordance with an embodiment of the present invention. In an embodiment, user specific summarization program 122 completes a one-time setup with a user who hosts, participates in, or attends a meeting on a virtual collaboration server tool. The one-time step allows for user specific summarization program 122 to capture relevant information about the user to create a user profile. In an embodiment, user specific summarization program 122 receives a request from the user to opt-in. In an embodiment, user specific summarization program 122 requests information from the user. In an embodiment, user specific summarization program 122 receives the requested information from the user. In an embodiment, user specific summarization program 122 creates a user profile. In an embodiment, user specific summarization program 122 stores the user profile. It should be appreciated that the process depicted in FIG. 2 illustrates one possible iteration of user specific summarization program 122, which may be repeated for each opt-in request received by user specific summarization program 122.

In step 210, user specific summarization program 122 receives a request from the user to opt-in. In an embodiment, user specific summarization program 122 receives a request from the user to opt-in to user specific summarization program 122. In an embodiment, user specific summarization program 122 receives a request from the user to opt-in to user specific summarization program 122 through user interface 132 of user computing device 130. By opting-in, the user agrees to share data with database 126.

In step 220, user specific summarization program 122 requests information from the user. In an embodiment, user specific summarization program 122 requests information from the user through user interface 132 of user computing device 130. Information requested from the user includes, but is not limited to, information about user preferences (e.g., general user system settings such as alert notifications for user computing device 130); information about alert notification preferences (e.g., an alert notification is sent when the user reconnects to the meeting from which the user disengaged or an alert notification is sent when the meeting from which the user disengaged is complete); and information necessary to create a user profile (e.g., information about the respective user's corporate profile, the hierarchy of the user's corporation, the user's position in the corporation's hierarchy, the user's seniority in the user's corporation, the user's primary job, the user's primary job functions, the user's technology interests, and the user's domain expertise). In an embodiment, responsive to user specific summarization program 122 receiving the request from the user to opt-in, user specific summarization program 122 requests information from the user.

In step 230, user specific summarization program 122 receives the requested information from the user. In an embodiment, user specific summarization program 122 receives the requested information from the user through user interface 132 of user computing device 130. In an embodiment, responsive to user specific summarization program 122 requesting information from the user, user specific summarization program 122 receives the requested information from the user.

In step 240, user specific summarization program 122 creates a user profile. In an embodiment, user specific summarization program 122 creates a user profile for the user. In an embodiment, user specific summarization program 122 creates a user profile with information input by the user during setup regarding the user as well as user preferences and alert notification preferences of the user. In an embodiment, responsive to user specific summarization program 122 receiving the requested information from the user, user specific summarization program 122 creates a user profile.

In step 250, user specific summarization program 122 stores the user profile. In an embodiment, user specific summarization program 122 stores the user profile in a database, e.g., a database, e.g., database 126. In an embodiment, responsive to user specific summarization program 122 creating the user profile, user specific summarization program 122 stores the user profile.

Figure 3:
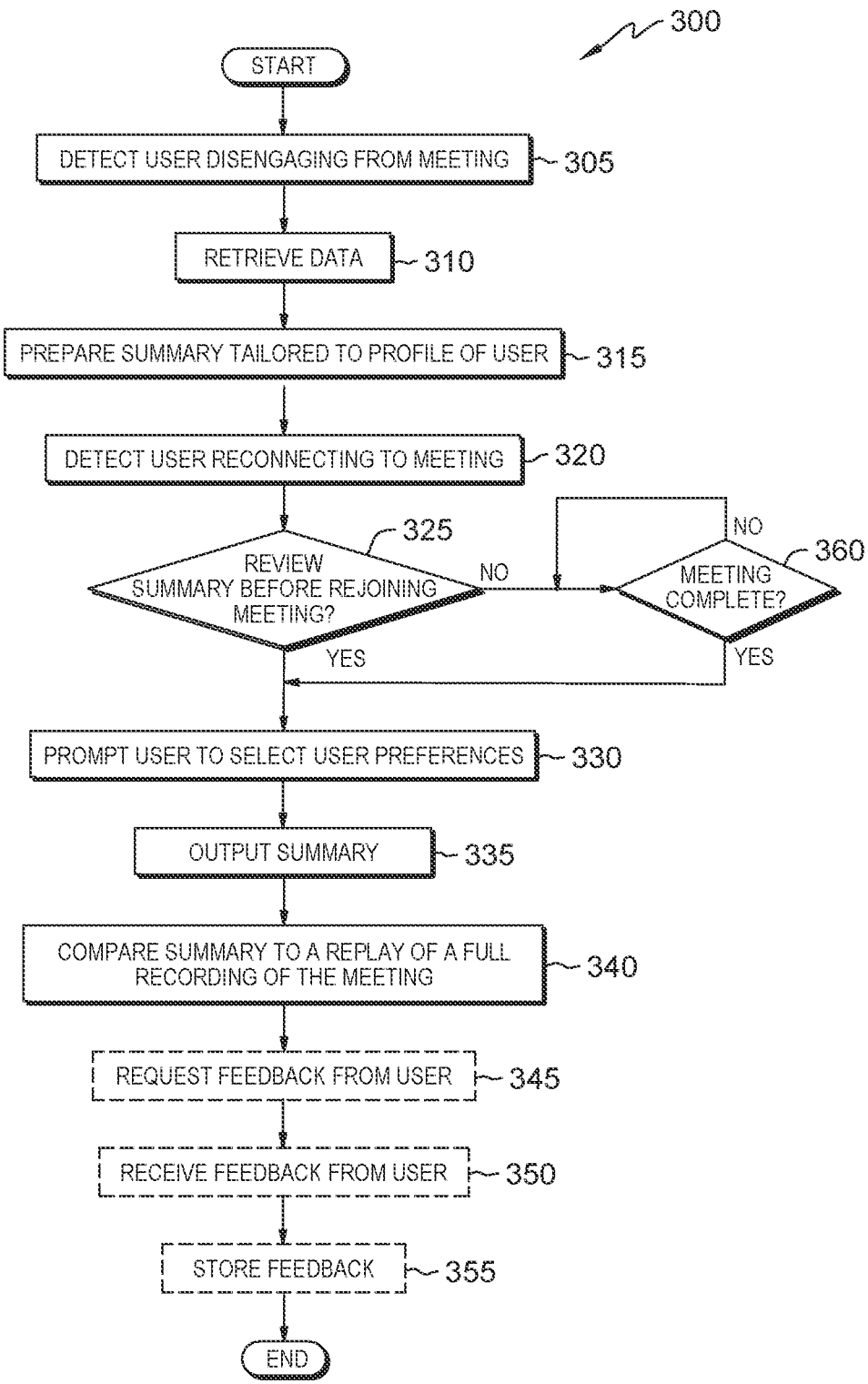
FIG. 3 is a flowchart illustrating the operational steps of a user specific summarization program in a distributed data processing environment, such as the one depicted in FIG. 1, in accordance with an embodiment of the present invention.

FIG. 3 is a flowchart, generally designated 300, illustrating the operational steps of user specific summarization program 122 in distributed data processing environment 100 of FIG. 1, in accordance with an embodiment of the present invention. In an embodiment, user specific summarization program 122 operates to detect when a user disengages from a meeting on a virtual collaboration server tool, to prepare a summary that is tailored to the profile of the user who disengages from the meeting on the virtual collaboration server tool and that covers the portion of the meeting during which the user was disengaged, to provide the user with the summary when the user reconnects to the meeting, and to gather feedback from the user in order to assist user specific summarization program 122 in preparing a more tailored summary in future iterations. It should be appreciated that the process depicted in FIG. 3 illustrates one possible iteration of the process flow, which can be repeated for each meeting the user hosts, participates in, or attends on a virtual collaboration server tool.

In step 305, user specific summarization program 122 detects when the user disengages from a meeting on a virtual collaboration server tool (e.g., Cisco Webex®, Zoom®, Google Meet®, Microsoft® Teams, etc.). In an embodiment, user specific summarization program 122 detects when the user disengages from a meeting on the virtual collaboration server tool in which there is one or more hosts and two or more participants. In an embodiment, user specific summarization program 122 detects when the user disengages from a meeting on the virtual collaboration server tool in which the host and/or a participant is utilizing one or more presentation tools (e.g., Microsoft® PowerPoint slides, Microsoft® Excel files, spreadsheets, web pages, diagrams, flowcharts, etc.).

In an embodiment, user specific summarization program 122 detects the user's explicit disengagement that is initiated by the user (e.g., user changes status to away, user signs out of meeting, etc.). In one or more embodiments, user specific summarization program 122 detects the user's implicit disengagement that is caused by technological issues (e.g., network connection issues, device malfunctions, power outages, etc.).

In a first example, user A, a Computer Science student, attends user A's online virtual classes on a virtual collaboration server tool. While attending class one day, user A experiences network connection issues. Because of the network connection issues user A experiences, user A is disconnected from user A's online virtual class. User specific summarization program 122 detects user A's implicit disengagement from user A's online virtual class.

In a second example, user B, an employee of a technology company, works from home. User B frequently has team meetings with user B's team on a virtual collaboration server tool. During one of user B's team meetings, user B disconnects from the team meeting to handle a personal emergency. User specific summarization program 122 detects user B's explicit disengagement from user B's team meeting.

In a third example, user C, a taxpayer of City X, attends City X's online council meetings on a virtual collaboration server tool. During one of City X's online council meetings that user C was attending, user C disconnects from the meeting to take a break. User specific summarization program 122 detects user C's explicit disengagement from City X's online council meeting.

In an embodiment, user specific summarization program 122 detects when the user disengages from a meeting on the virtual collaboration server tool for a pre-set period of time that is longer than ten minutes but less than thirty minutes. In one or more embodiments, user specific summarization program 122 detects when the user disengages from a meeting on the virtual collaboration server tool for a pre-set percentage of the total allotted time of a pre-scheduled meeting (e.g., a user disengaged for ten percent to twenty-five percent (e.g., 6 to 15 minutes) of the total allotted time of a pre-scheduled meeting (e.g. 60 minutes)).

In an embodiment, user specific summarization program 122 captures the start time of the meeting on the virtual collaboration server tool. In an embodiment, user specific summarization program 122 captures the start time of the user's disengagement, i.e., the time during the meeting when the user disconnected either explicitly or implicitly.

In step 310, user specific summarization program 122 retrieves data. In an embodiment, user specific summarization program 122 retrieves data for the purpose of preparing a summary that is tailored to the profile of the user who disengages from the meeting on the virtual collaboration server tool and that covers the portion of the meeting during which the user was disengaged.

In an embodiment, user specific summarization program 122 retrieves data regarding the user. In one or more embodiments, user specific summarization program 122 retrieves data regarding the other participants of the meeting. In one or more embodiments, user specific summarization program 122 retrieves data regarding the connections between the user and the other participants of the meeting. In one or more embodiments, user specific summarization program 122 retrieves data regarding interactions between participants, including specific callouts of participants, questions asked by participants, and answers provided to questions asked by participants. In one or more embodiments, user specific summarization program 122 retrieves data regarding the topic of the meeting.

In an embodiment, user specific summarization program 122 retrieves data from sources including, but not limited to, the user profile created in step 240; the user's corporate profile; the user's calendar; the user profiles of other participants; the corporate profile of other participants; the calendar of other participants; the one or more presentation tools (e.g., Microsoft® PowerPoint slides, Microsoft® Excel files, spreadsheets, web pages, diagrams, flowcharts, etc.) used by the host and/or the participant; and data stored in a database (e.g., database 126) from prior meetings the user hosted, participated in, or attended. The examples of user specific summarization program 122 retrieving data are described herein with individual methods, but it should be noted that user specific summarization program 122 may retrieve data via one or more combinations of the above embodiments. In an embodiment, responsive to user specific summarization program 122 detecting when the user disengaged from the meeting on the virtual collaboration server tool, user specific summarization program 122 retrieves data.

In step 315, user specific summarization program 122 prepares a summary. In an embodiment, user specific summarization program 122 prepares a summary that is tailored to the profile of the user who disengages from the meeting on the virtual collaboration server tool and that covers the portion of the meeting during which the user was disengaged. In an embodiment, user specific summarization program 122 prepares a summary by applying the concepts of (1) merging and (2) speech-to-text summarization using an extractive text summarization algorithm. In an embodiment, user specific summarization program 122 prepares a summary by applying the concepts of (1) merging and (2) speech-to-text summarization using an extractive text summarization algorithm to audio and/or video frames extracted from the portion of the meeting during which the user was disengaged. In an embodiment, user specific summarization program 122 prepares a summary by applying the concepts of (1) merging and (2) speech-to-text summarization using an extractive text summarization algorithm to the one or more presentation tools (e.g., Microsoft® PowerPoint slides, Microsoft® Excel files, spreadsheets, web pages, diagrams, flowcharts, etc.) used by the host and/or the participant.

The extractive text summarization algorithm is applied by identifying and extracting the important sentences and other salient information from a given audio, video, and/or text file. The sentences that are extracted from the text file are assigned a weight and ranked based on sentence's given weight. The highly ranked sentences are grouped together to form a concise summary. Expressed in a different way, the extractive text summarization algorithm is applied by identifying important sections of the text and generating them verbatim to produce a subset of the sentences from the original text as a summary.

Figure 4:
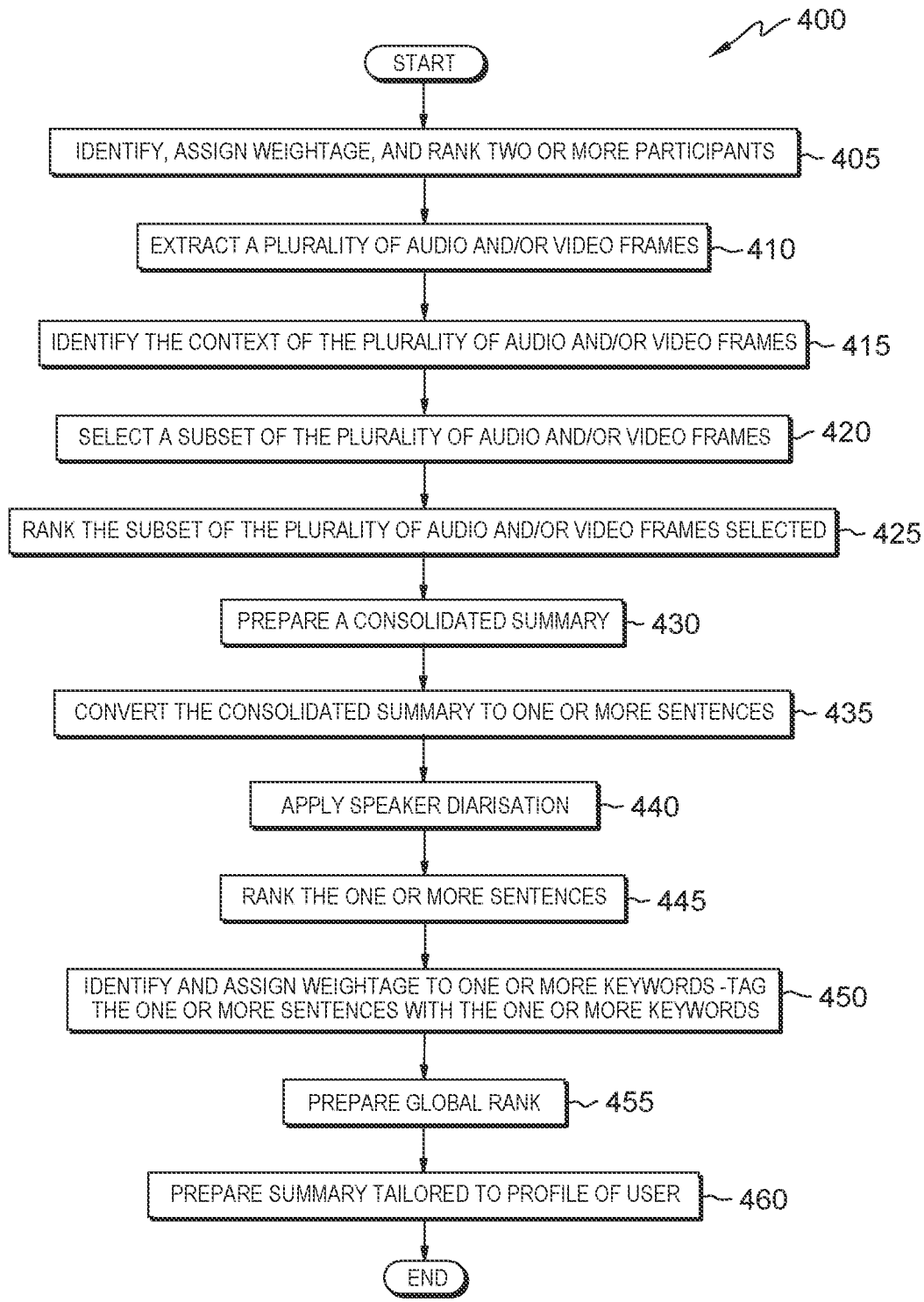
FIG. 4 is a flowchart illustrating the operational steps of a machine learning component of a user specific summarization program in a distributed data processing environment, such as the one depicted in FIG. 1, in accordance with an embodiment of the present invention.

Step 315 is described in further detail with respect to flowchart 400 in FIG. 4. In an embodiment, responsive to user specific summarization program 122 retrieving data, user specific summarization, program 122 prepares a summary.

In step 320, user specific summarization program 122 detects when the user reconnects to the meeting on the virtual collaboration server tool. In an embodiment, user specific summarization program 122 captures the user's reengagement time, i.e., the time during the meeting when the user reconnected. In an embodiment, user specific summarization program 122 calculates the overall duration of the user's disengagement period, i.e., the total duration of time the user was disengaged from the meeting. If user specific summarization program 122 determines that the overall duration of the user's disengagement period is longer than the pre-set period of time or the pre-set percentage of the total allotted time of a pre-scheduled meeting, then user specific summarization program 122 will not output the summary to the user. In an embodiment, responsive to user specific summarization program 122 preparing a summary, user specific summarization program 122 detects when the user reconnects to the meeting on the virtual collaboration server tool.

In the first example, after resolving user A's network connection issues, user A reconnects to user A's online virtual class within ten minutes of disconnecting. User specific summarization program 122 detects user A reconnecting, captures user A's reengagement time, and calculates the overall duration of user A's disengagement period from user A's online virtual class to be ten minutes.

In the second example, after handling user B's personal emergency, user B reconnects to user B's team meeting within fifteen minutes of disconnecting. User specific summarization program 122 detects user B reconnecting, captures user B's reengagement time, and calculates the overall duration of user B's disengagement period from user B's team meeting to be fifteen minutes.

In the third example, after taking user C's break, user C reconnects to City X's online council meeting within ten minutes of disconnecting. User specific summarization program 122 detects user C reconnecting, captures user C's reengagement time, and calculates the overall duration of user C's disengagement from City X's online council meeting to be ten minutes.

In decision 325, user specific summarization program 122 determines whether the user will review the summary before rejoining the meeting. In an embodiment, user specific summarization program 122 determines whether the user will review the summary before rejoining the meeting based on a user preference the user set in step 220. In one or more embodiments, user specific summarization program 122 determines whether the user will review the summary before rejoining the meeting based on a user's decision. In one or more embodiments, user specific summarization program 122 determines whether the user will review the summary before rejoining the meeting based on a machine-driven recommendation. For example, the information the user missed during the user's disengagement period is necessary to know before rejoining, therefore, user specific summarization program 122 recommends that the user read the summary before rejoining. The examples of user specific summarization program 122 determining whether the user will review the summary before rejoining the meeting are described herein with individual methods, but it should be noted that user specific summarization program 122 may determine whether the user will review the summary before rejoining the meeting via one or more combinations of the above embodiments. In an embodiment, responsive to user specific summarization program 122 detecting when the user reconnects to the meeting on the virtual collaboration server tool, user specific summarization program 122 determines whether the user will review the summary before rejoining the meeting.

If user specific summarization program 122 determines the user will review the summary before rejoining the meeting (decision 325, YES branch), then user specific summarization program 122 prompts the user to select how the user would prefer (i.e., user preferences) to review the summary (step 330). If user specific summarization program 122 determines the user will not review the summary before rejoining the meeting (decision 325, NO branch), then user specific summarization program 122 determines whether the meeting is complete before prompting the user to select how the user would prefer to review the summary (decision 360).

In decision 360, user specific summarization program 122 determines whether the meeting is complete. In an embodiment, user specific summarization program 122 determines the meeting is complete when the host closes out the meeting. In an embodiment, responsive to user specific summarization program 122 determining the user will not review the summary before rejoining the meeting, user specific summarization program 122 determines whether the meeting is complete.

If user specific summarization program 122 determines the meeting is complete (decision 360, YES branch), then user specific summarization program 122 prompts the user to select how the user would prefer to review the summary (step 330). If user specific summarization program 122 determines the meeting is not complete (decision 360, NO branch), then user specific summarization program 122 waits until the meeting is complete before proceeding to step 330.

In an example, user C, the taxpayer of City X who attends City X's online council meetings on a virtual collaboration server tool, reconnects to City X's online council meetings. User specific summarization program 122 detects user C reconnecting. Instead of delaying user C from rejoining the meeting, user specific summarization program 122 makes a machine-driven recommendation that user C wait until City X's online council meeting is complete to review the summary. User specific summarization program 122 does not prompt user C to select how user C would prefer to review the summary until after the meeting is complete.

Returning to decision 325, if user specific summarization program 122 determines the user will review the summary before rejoining the meeting (decision 325, YES branch), then user specific summarization program 122 proceeds to step 330, prompting the user to select how the user would prefer to review the summary. In step 330, user specific summarization program 122 prompts the user to select how the user would prefer to review the summary. In an embodiment, user specific summarization program 122 prompts the user with default selections for settings including, but not limited to, language, viewing mode, audio, and subtitles. The default selections provide the user with the recommended experience (e.g., English (US) language, high-bandwidth video viewing mode, audio on, and subtitles off) and are based on the user preferences set by the user in step 220. In an embodiment, user specific summarization program 122 prompts the user to change the default selections to select more suitable options for the user's work environment. For example, the user may change the default language setting to an alternative language (e.g., Deutsch, English (US), Español (América Latina), Franεais, Franεais (Canada), Italiano, Polski, Português, Português (Brasil), etc.), change the default viewing mode to an alternative viewing mode (e.g., high-bandwidth video, low-bandwidth video, text and graphics), change the default audio setting (e.g., on or off), and/or change the default subtitle setting (e.g., on or off). In an embodiment, user specific summarization program 122 prompts the user to select how the user would prefer to review the summary through user interface 132 of user computing device 130. In an embodiment, responsive to user specific summarization program 122 determining the user will review the summary, user specific summarization program 122 prompts the user to select how the user would prefer to review the summary.

In step 335, user specific summarization program 122 outputs the summary. In an embodiment, user specific summarization program 122 outputs the summary in the format selected by the user in step 330. In an embodiment, user specific summarization program 122 outputs the summary as an alert notification. In an embodiment, user specific summarization program 122 outputs the summary to the user through user interface 132 of user computing device 130. In an embodiment, responsive to user specific summarization program 122 prompting the user to select how the user would prefer to review the summary, user specific summarization program 122 outputs the summary.

In the first example, user A, the Computer Science student who was attending an online virtual class on a virtual collaboration server tool and was experiencing network connection issues, reconnects to user A's online virtual class. User specific summarization program 122 detects user A reconnecting and asks whether user A would prefer to review the summary before rejoining the class or to wait until the class is complete to review the summary. User A chooses to review the summary before rejoining user A's online virtual class. User A selects to review the summary with the default selections and is moved to a breakout room. User A receives a 30 second video with audio to watch. User A is now up to date on what user A missed while user A was disengaged and is prepared to rejoin user A's online virtual class.

In the second example, user B, the employee of a technology company who was working from home and was participating in a team meeting with user B's team on a virtual collaboration server tool, reconnects to user B's team meeting. User specific summarization program 122 detects user B reconnecting and asks whether user B would prefer to review the summary before rejoining the team meeting or to wait until the team meeting is complete to review the summary. User B chooses to review the summary before rejoining the team meeting. User B changes the default audio setting to "off" and the default subtitle setting to "on." User B remains in the current meeting room to review the summary. User B receives a 30 second video with subtitles to watch. User B is now up to date on what user B missed while user B was disengaged and is prepared to rejoin user B's team meeting.

In the third example, City X's online council meeting is complete. User specific summarization program 122 outputs the summary to user C. User C receives a 30 second video with audio to watch. User C is now up to date on what user C missed while user C was disengaged from City X's online council meeting.

In step 340, user specific summarization program 122 compares the summary to a replay of a full recording of the meeting. In an embodiment, user specific summarization program 122 extracts key entities from the summary and from the replay of the full recording of the meeting. In an embodiment, user specific summarization program 122 matches the key entities extracted from the summary and from the replay of the full recording of the meeting that are similar. In an embodiment, user specific summarization program 122 compares the summary to the replay of the full recording of the meeting to ensure that the meaning of the summary and the meeting are the same. In an embodiment, responsive to user specific summarization program 122 outputting the summary, user specific summarization program 122 compares the summary to a replay of a full recording of the meeting.

In step 345, user specific summarization program 122 requests feedback from the user. In an embodiment, user specific summarization program 122 requests feedback from the user regarding the output of the summary in step 335. In an embodiment, user specific summarization program 122 provides the user with three options (i.e., −1, 0, +1) from which the user can only select one. The three options provided to the user represent the likely satisfactory level of the user (i.e., not satisfactory, neutral, satisfactory, respectively). In an embodiment, user specific summarization program 122 requests feedback from the user through user interface 132 of user computing device 130. In an embodiment, responsive to comparing the summary to a replay of a full recording of the meeting, user specific summarization program 122 requests feedback from the user.

In step 350, user specific summarization program 122 receives feedback from the user. In an embodiment, user specific summarization program 122 receives feedback from the user through user interface 132 of user computing device 130. In an embodiment, user specific summarization program 122 uses the feedback to improve user specific summarization program 122 in preparing more tailored summaries in future iterations of the process. In an embodiment, user specific summarization program 122 improves user specific summarization program 122 using reinforcement learning. In an embodiment, user specific summarization program 122 uses ReLU or Leaky ReLU as the activation function to increase accuracy. In an embodiment, user specific summarization program 122 performs speech-to-text (STT) recognition on the audio and/or video frames to prepare triples. In an embodiment, user specific summarization program 122 pushes the top N ranked sentences to the end user. In an embodiment, user specific summarization program 122 uses the meeting summarizer as a reinforcement learning agent and models the iterative process after a Markov decision process during the cooperative process. In an embodiment, user specific summarization program 122 performs the Q-learning technique on State-Action (S-A) pairs in order to speed up the algorithm's run time. The Q-learning technique acts as a crib sheet for the reinforcement learning (RL) agent. The Q-learning technique enables the RL agent to use the feedback from the environment to learn the best actions it can take in different circumstances. The Q-learning technique also uses the Q-values to track and improve the performance of the RL agent. Initially, the Q-values are set at any arbitrary value. However, when the RL agent performs different actions and receives feedback (i.e., not satisfactory, neutral, satisfactory) on the actions, the Q-values are updated. In an embodiment, user specific summarization program 122 designs its reinforcement learning system so that the reward increases as the time increases. The maximum value of reward per episode shows that the RL agent learned to take right action by maximizing its total reward. In an embodiment, responsive to user specific summarization program 122 requesting feedback from the user, user specific summarization program 122 receives feedback from the user.

In step 355, user specific summarization program 122 stores the feedback. In an embodiment, user specific summarization program 122 stores the feedback received from the user. In an embodiment, user specific summarization program 122 stores the feedback received from the user in a database, e.g., database 126. In an embodiment, responsive to user specific summarization program 122 receiving feedback from the user, user specific summarization program 122 stores the feedback.

In some embodiments, user specific summarization program 122 may perform steps 345, 350, and 355 as optional steps.

FIG. 4 is a flowchart, generally designated 400, illustrating the operational steps of machine learning component 124 of user specific summarization program 122 in distributed data processing environment 100 of FIG. 1, in accordance with an embodiment of the present invention. In an embodiment, user specific summarization program 122 operates to prepare a summary that is tailored to the profile of the user who disengages from a meeting on the virtual collaboration server tool and that covers the portion of the meeting during which the user was disengaged by applying the concepts of merging, extractive summarization, speaker diarisation and machine learning. In an embodiment, machine learning component 124 of user specific summarization program 122 runs continuously for the entire duration of the meeting the user hosts, participates in, or attends on a virtual collaboration server tool. It should be appreciated that the process depicted in FIG. 4 illustrates one possible iteration of the process flow.

In step 405, user specific summarization program 122 identifies the two or more participants of the meeting. In an embodiment, user specific summarization program 122 identifies the two or more participants of the meeting through information gathered from the virtual collaboration server tool (e.g., from a participant list or from an attendance report). In an embodiment, user specific summarization program 122 assigns a weightage to the two or more participants of the meeting. In an embodiment, user specific summarization program 122 assigns a weightage to the two or more participants of the meeting based on a set of factors. The set of factors include, but are not limited to, the participant's role in the meeting (i.e., organizer of the meeting, required attendee of the meeting, optional attendee of the meeting, etc.), the participant's role in the participant's corporation, and the participant's relatedness to the user who disengaged from the meeting. In an embodiment, user specific summarization program 122 ranks the two or more participants of the meeting based on the participant's assigned weightage, i.e., ranks the participants from the most relevant to the user to the least relevant to the user. In an embodiment, user specific summarization program 122 provides the user with the ability to override such ranking of the two or more participants. In an embodiment, user specific summarization program 122 provides the user with the ability to override such ranking though user interface 132 of user computing device 130.

In step 410, user specific summarization program 122 extracts a plurality of audio and/or video frames. In an embodiment, user specific summarization program 122 extracts a plurality of audio and/or video frames from the portion of the meeting the user was disengaged. In an embodiment, user specific summarization program 122 continuously extracts the plurality of audio and/or video frames until a summary is prepared and outputted to the user who disengaged from the meeting.

In an embodiment, user specific summarization program 122 counts the number of audio and/or video frames extracted from the portion of the meeting the user was disengaged. In an embodiment, user specific summarization program 122 counts the number of audio and/or video frames that contain the name of the user (e.g., audio and/or video frames during which the name of the user was mentioned by the host of the meeting because the user was expected to speak or answer a question or audio and/or video frames during which the name of the user was called out by the host of the meeting to join a small breakout group). In an embodiment, responsive to user specific summarization program 122 identifying the two or more participants of the meeting, user specific summarization program 122 extracts a plurality of audio and/or video frames.

In step 415, user specific summarization program 122 identifies the context of the plurality of audio and/or video frames. In an embodiment, user specific summarization program 122 identifies the context of the plurality of audio and/or video frames extracted from the portion of the meeting the user was disengaged. In an embodiment, user specific summarization program 122 identifies the context of the plurality of audio and/or video frames in order to understand the intent and/or the topic of the meeting. In an embodiment, responsive to user specific summarization program 122 extracting the plurality of audio and/or video frames, user specific summarization program 122 identifies the context of the plurality of audio and/or video frames.

In step 420, user specific summarization program 122 selects a subset of the plurality of audio and/or video frames. In an embodiment, user specific summarization program 122 selects the subset of the plurality of audio and/or video frames based on whether the audio and/or video frame contributes to the preparation of the summary for the user who disengaged from the meeting. In an embodiment, responsive to user specific summarization program 122 identifying the context of the plurality of audio and/or video frames, user specific summarization program 122 selects a subset of the plurality of audio and/or video frames.

In step 425, user specific summarization program 122 ranks the subset of the plurality of audio and/or video frames selected in step 420. In an embodiment, user specific summarization program 122 ranks the subset of the plurality of audio frames. In another embodiment, user specific summarization program 122 ranks the subset of the plurality of video frames. In another embodiment, user specific summarization program 122 ranks the subset of the plurality of audio and video frames.

In an embodiment, user specific summarization program 122 ranks the subset of the plurality of audio and/or video frames using an algorithmic approach. In one or more embodiments, user specific summarization program 122 ranks the subset of the plurality of audio and/or video frames based on whether the audio and/or video frames contain the name of the user who disengaged from the meeting. In one or more embodiments, user specific summarization program 122 ranks the subset of the plurality of audio and/or video frames based on the ranking the participants received in step 405. In one or more embodiments, user specific summarization program 122 ranks the subset of the plurality of audio and/or video frames based on the relationship between the participant and the user who disengaged from the meeting. The relatedness of the participant to the user who disengaged from the meeting is determined by a set of factors, including, but not limited to, the participant's role in the meeting (i.e., organizer of the meeting, required attendee of the meeting, optional attendee of the meeting), the participant's corporate profile, the hierarchy of the participant's corporation, the participant's position in the corporation's hierarchy, the participant's seniority in the participant's corporation, the participant's primary job, the participant's primary job functions. In one or more embodiments, user specific summarization program 122 ranks the subset of the plurality of audio and/or video frames based on the user's technology interests. In one or more embodiments, user specific summarization program 122 ranks the subset of the plurality of audio and/or video frames based on the user's domain expertise. In one or more embodiments, user specific summarization program 122 ranks the subset of the plurality of audio and/or video frames based on historical analysis. The examples of user specific summarization program 122 ranking the subset of the plurality of audio and/or video frames are described herein with individual methods, but it should be noted that user specific summarization program 122 may rank the subset of the plurality of audio and/or video frames via one or more combinations of the above embodiments.

In an embodiment, responsive to user specific summarization program 122 selecting the subset of the plurality of audio and/or video frames, user specific summarization program 122 ranks the subset of the plurality of audio and/or video frames selected in step 420.

In step 430, user specific summarization program 122 prepares a consolidated summary. In an embodiment, user specific summarization program 122 prepares a consolidated summary of the plurality of audio frames that ranked above an algorithmically determined threshold value. In another embodiment, user specific summarization program 122 prepares a consolidated summary of the plurality of video frames that ranked above an algorithmically determined threshold value. In another embodiment, user specific summarization program 122 prepares a consolidated summary of the plurality of audio and video frames that ranked above an algorithmically determined threshold value.

In an embodiment, user specific summarization program 122 prepares a consolidated summary by merging the plurality of audio and/or video frames that ranked above the algorithmically determined threshold value. In an embodiment, user specific summarization program 122 prepares a consolidated summary by merging the plurality of audio and/or video frames that ranked above the algorithmically determined threshold value by stitching together the plurality of audio and/or video frames that ranked above the algorithmically determined threshold value sequentially. In an embodiment, user specific summarization program 122 prepares a consolidated summary by cancelling the plurality of audio and/or video frames that did not rank above the algorithmically determined threshold value. The threshold value is dynamic and varies for each user of user specific summarization program 122. In an embodiment, user specific summarization program 122 sets the algorithmically determined threshold value in line with the machine learning for the training data set.

In an embodiment, responsive to user specific summarization program 122 ranking the subset of the plurality of audio and/or video frames, user specific summarization program 122 prepares a consolidated summary.

In the first example, user A's online virtual class on the virtual collaboration server tool is hosted by teacher X. Guest speaker Y also participates in user A's online virtual class. While user A is disengaged from the online virtual class because of user A's network connection issues, teacher X presents twenty-five Microsoft® PowerPoint slides. The initial slide teacher X presents is slide 1. However, teacher X references slide 25 very briefly to explain what guest speaker Y will be presenting later in the class. Teacher X then refers back to and discusses slide 2 through 24 before user A reconnects to user A's online virtual class. In this case, user specific summarization program 122 ranks slides 1 and 25 higher than slides 2 through 24 because slides 1 and 25 contain high content information. Slides 1 and 25 are merged.

In the second example, user B's team meeting on the virtual collaboration server tool is hosted by team leader X. While user B is disengaged from the team meeting, team leader X presents a video that resonated much better with the team members than a technical slide due to the video being less technical and more illustrative. In this case, user specific summarization program 122 ranks the video higher than the technical slide. The video and the other highly ranked slides are merged together, but the technical slide is cancelled.

In step 435, user specific summarization program 122 converts the consolidated summary to one or more sentences. In an embodiment, user specific summarization program 122 converts the consolidated summary to one or more sentences in text format. In an embodiment, user specific summarization program 122 converts the consolidated summary to one or more sentences using an extractive text summarization algorithm. In an embodiment, user specific summarization program 122 identifies the important sentences and other salient information in the consolidated summary. In an embodiment, user specific summarization program 122 extracts the important sentences and other salient information from the consolidated summary. The speech-to-text summarization using the extractive text summarization algorithm occurs for the entire duration of the meeting but keeps open a rolling window of thirty minutes in duration. In an embodiment, responsive to user specific summarization program 122 preparing a consolidated summary, user specific summarization program 122 converts the consolidated summary to one or more sentences.

In step 440, user specific summarization program 122 applies speaker diarisation. Speaker diarisation is the process of partitioning an input audio stream into homogeneous segments according to the speaker's identity. Speaker diarisation enhances the readability of an automatic speech transcription by structuring the audio stream into speaker turns and, when used together with a speaker recognition system, by providing the speaker's true identity. Speaker diarisation is a combination of speaker segmentation and speaker clustering. Speaker segmentation aims to find speaker change points in the audio stream. Speaker clustering aims to group together speech segments on the basis of characteristics of the speaker. In an embodiment, user specific summarization program 122 finds the speaker change points in the audio frames (i.e., speaker segmentation). In an embodiment, user specific summarization program 122 groups together speech segments based on characteristics of the speaker (i.e., speaker clustering). In an embodiment, responsive to user specific summarization program 122 converting the consolidated summary to one or more sentences, user specific summarization program 122 applies speaker diarisation.

In step 445, user specific summarization program 122 ranks the one or more sentences. In an embodiment, user specific summarization program 122 ranks the one or more sentences based on a set of factors including, but not limited to, the speaker's role in the meeting (i.e., host, participant, attendee) and the relatedness of the sentence to the intent and/or topic of the meeting. In an embodiment, user specific summarization program 122 retains the top N most useful sentences. N may be a user preference set by the user in step 220 or a machine-driven recommendation. In an embodiment, responsive to user specific summarization program 122 applying speaker diarisation, user specific summarization program 122 ranks the one or more sentences.

For example, if an important person (e.g., the host of the meeting) spoke one hundred sentences during the duration of the user's disengagement from the meeting, then user specific summarization program 122 ranks all one hundred sentences in order of importance. However, N is set at twenty-five, so user specific summarization program 122 will only retain the top twenty-five sentences spoken.

In another example, if an important person (e.g., the host of the meeting) spoke one hundred sentences during the duration of the user's disengagement from the meeting, then user specific summarization program 122 ranks all one hundred sentences in order of importance. A machine-driven recommendation is made for user specific summarization program 122 to retain all one hundred sentences because all one hundred sentences are important, so user specific summarization program 122 retains all one hundred sentences.

In yet another example, if an important person (e.g., the host of the meeting) had only spoken one sentence, then user specific summarization program 122 retains the one sentence.

In step 450, user specific summarization program 122 identifies one or more keywords. In an embodiment, user specific summarization program 122 identifies one or more keywords in the one or more sentences. In an embodiment, user specific summarization program 122 identifies one or more keywords in relation to the intent and/or topic of the meeting. In an embodiment, user specific summarization program 122 identifies one or more keywords in relation to the two or more participants of the meeting.

In an embodiment, user specific summarization program 122 assigns a weightage to the one or more keywords. In an embodiment, user specific summarization program 122 assigns a weightage to the one or more keywords based on the keyword's relatedness to the intent and/or topic of the meeting. In an embodiment, user specific summarization program 122 assigns a weightage to the one or more keywords based on the keyword's relatedness to two or more participants of the meeting.

For example, three sentences, S10, S11, and S12, are candidates for multiple participants of a meeting. A ranking system to rank such sentences based on the frequency of a keyword aligned to a particular participant is built. From S10, S11, and S12, keywords are identified. The keywords identified are "data," "algorithm," and "k-means clustering." Participant X10 is a Data Scientist. Participant X11 is a Solution Architect. X10 would be more interested in a sentence with the keywords "data," "algorithm," and "k-means clustering," whereas X11 would only be interested in a sentence with the keyword "data."

In an embodiment, user specific summarization program 122 tags the one or more sentences. In an embodiment, user specific summarization program 122 tags the one or more sentences using a tagging system. In an embodiment, user specific summarization program 122 tags the one or more sentences with a word or phrase to describe the intent of the one or more sentences. In an embodiment, responsive to user specific summarization program 122 ranking the one or more sentences, user specific summarization program 122 identifies one or more keywords.

For example, three sentences, S1, S2, and S3, are spoken with the intent of motivating or gathering the attention of a group of people. A tagging system is used to tag these sentences as "motivational" or "focusing the attention of a group." Three sentences, S4, S5, and S6, are spoken with the intent of lightening the mood of a group of people. The tagging system is used to tag these sentences as "lighten mood." Three sentences, S7, S8, and S9, are spoken for no purpose at all. The tagging system is used to tag these sentences as "meaningless."

In step 455, user specific summarization program 122 prepares a global ranking. In an embodiment, user specific summarization program 122 prepares a global ranking incorporating the two or more participants identified and assigned a weightage in step 405, the one or more keywords identified and assigned a weightage in step 450, and the subset of the one or more sentences ranked in step 455. In an embodiment, user specific summarization program 122 allows the user who disengaged from the meeting to override the ranking priority in order to assist user specific summarization program 122 in preparing a more tailored summary for the user. In an embodiment, responsive to user specific summarization program 122 identifying one or more keywords, user specific summarization program 122 prepares a global ranking.

In step 460, user specific summarization program 122 prepares a summary. In an embodiment, user specific summarization program 122 prepares a summary using a machine learning algorithm. In an embodiment, user specific summarization program 122 prepares a summary for each participant assigned a weightage in step 405. In one or more embodiments, user specific summarization program 122 prepares a summary for the top N ranked participants. N may be a user preference set by the user in step 220 or a machine-driven recommendation.

For example, fifteen people (i.e., X1, X2, . . . , X15) participate in a meeting. User specific summarization program 122 assigns a weightage to each participant based on the participant's role in the meeting, the participant's role in the participant's corporation, and the participant's relatedness to the user who disengaged from the meeting. User specific summarization program 122 prepares a summary for the top five ranked participants (i.e., X1, X2, X3, X4, and X5).

In an embodiment, user specific summarization program 122 tailors each summary prepared to the profile of the user who disengaged from the meeting. In an embodiment, user specific summarization program 122 tailors each summary using the global ranking prepared in step 455. In an embodiment, user specific summarization program 122 tailors each summary to proportionally match the relationship between the participant who spoke during the meeting and the user who disengaged from the meeting. The relatedness of the participant to the user who disengaged from the meeting is determined by a set of factors. The set of factors include, but are not limited to, the participant's role in the meeting (i.e., organizer of the meeting, required attendee of the meeting, optional attendee of the meeting), the participant's corporate profile, the hierarchy of the participant's corporation, the participant's position in the corporation's hierarchy, the participant's seniority in the participant's corporation, the participant's primary job, the participant's primary job functions, the user's technology interests, and the user's domain expertise, whether the name of the participant was mentioned by the host of the meeting because the participant was expected to speak or answer a question, and whether the participant was speaking during the meeting.

In an embodiment, user specific summarization program 122 tailors each summary using a speech recognition confidence score and/or an intent confidence score. In an embodiment, responsive to user specific summarization program 122 preparing a global ranking, user specific summarization program 122 prepares a summary.

Figure 5:
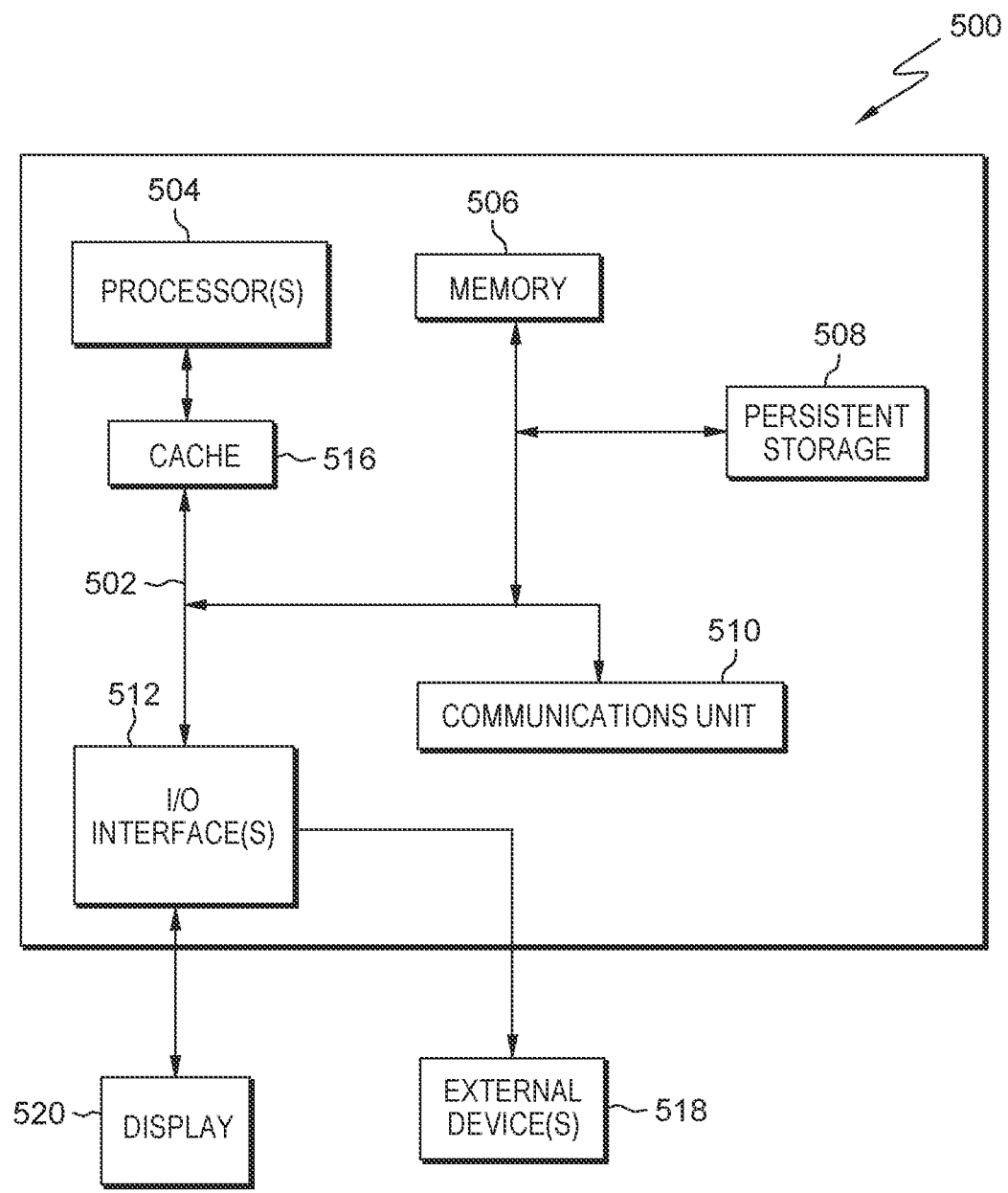
FIG. 5 is a block diagram of the components of a computing device in a distributed data processing environment, such as the one depicted in FIG. 1, in accordance with an embodiment of the present invention.

FIG. 5 is a block diagram of the components of computing device 500 in distributed data processing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Computing device 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Programs may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Programs may be downloaded to persistent storage 508 through communications unit 510.

I/O interface(s) 512 allows for input and output of data with other devices that may be connected to server 120 and/or user computing device 130. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network or a wide area network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    detecting, by one or more processors, a user disengaging from a virtual meeting having at least two participants for a pre-set period of time or for a pre-set percentage of a total allotted time of a pre-scheduled virtual meeting;
    retrieving, by one or more processors, a first set of data regarding the user, a second set of data regarding the at least two participants of the virtual meeting, and a third set of data regarding a relationship between the user and the at least two participants of the virtual meeting from a database;
    preparing, by one or more processors, a summary that is tailored to a profile of the user and that covers a portion of the virtual meeting during which the user was disengaged;
    detecting, by one or more processors, the user reconnecting to the virtual meeting;
    determining, by one or more processors, whether the user will review the summary before rejoining the virtual meeting based on a pre-set user preference, a decision made by the user, or a machine-driven recommendation;
    responsive to determining the user will review the summary before rejoining the virtual meeting, prompting, by one or more processors, the user with a set of default user preferences to review the summary;
    outputting, by one or more processors, the summary to the user; and
    subsequent to outputting the summary to the user, comparing, by one or more processors, the summary to a replay of a full recording of the virtual meeting.

2. The computer-implemented method of claim 1 further comprising:
    requesting, by one or more processors, feedback from the user;
    receiving, by one or more processors, the feedback from the user;
    improving, by one or more processors, the accuracy of a plurality of future summaries prepared using reinforcement learning; and
    storing, by one or more processors, the feedback from the user in the database.

3. The computer-implemented method of claim 2, wherein comparing the summary to the replay of the full recording of the virtual meeting further comprises:
    extracting, by one or more processors, a first set of one or more key entities from the summary and a second of one or more key entities from the full recording of the virtual meeting; and
    matching, by one or more processors, the first set of one or more key entities from the summary with the second set of one or more key entities from the full recording of the virtual meeting.

4. The computer-implemented method of claim 2, wherein requesting feedback from the user further comprises:
    providing, by one or more processors, the user with three or more selections representing the satisfactory level of the user, wherein the three or more selections include not satisfactory, neutral, and satisfactory.

5. The computer-implemented method of claim 1, wherein preparing the summary that is tailored to the profile of the user and that covers the portion of the virtual meeting during which the user was disengaged further comprises:
    identifying, by one or more processors, the at least two participants of the virtual meeting;
    assigning, by one or more processors, a weightage to the at least two participants of the virtual meeting based on a first set of factors; and
    ranking, by one or more processors, the at least two participants of the virtual meeting based on the weightage the at least two participants were assigned.

6. The computer-implemented method of claim 5 further comprising:

subsequent to ranking the at least two participants of the virtual meeting based on the weightage the at least two participants were assigned, extracting, by one or more processors, a plurality of audio frames, a plurality of video frames, and a plurality of audio and video frames from the portion of the virtual meeting during which the user was disengaged; and identifying, by one or more processors, a context of the plurality of audio frames, of the plurality of video frames, and of the plurality of audio and video frames in order to understand the one or more topics of the virtual meeting.

7. The computer-implemented method of claim 6 further comprising:

subsequent to identifying the context of the plurality of audio frames, of the plurality of video frames, and of the plurality of audio and video frames in order to understand the one or more topics of the virtual meeting, selecting, by one or more processors, a subset of the plurality of audio frames, a subset of the plurality of video frames, and a subset of the plurality of audio and video frames based on whether the plurality of audio frames, the plurality of video frames, and the plurality of audio and video frames relate to the profile of the user;

ranking, by one or more processors, the subset of the plurality of audio frames, the subset of the plurality of video frames, and the subset of the plurality of audio and video frames using an algorithmic approach or a second set of factors;

merging, by one or more processors, the subset of the plurality of audio frames, the subset of the plurality of video frames, and the subset of the plurality of audio and video frames that ranked above an algorithmically determined threshold value; and preparing, by one or more processors, a consolidated summary of the subset of the plurality of audio frames that ranked above the algorithmically determined threshold value, a consolidated summary of the subset of the plurality of video frames that ranked above the algorithmically determined threshold value, and a consolidated summary of the subset of the plurality of audio and video frames that ranked above the algorithmically determined threshold value.

8. The computer-implemented method of claim 7 further comprising:

subsequent to preparing a consolidated summary of the subset of the plurality of audio frames that ranked above the algorithmically determined threshold value, of the subset of the plurality of video frames that ranked above the algorithmically determined threshold value, and of the subset of the plurality of audio and video frames that ranked above the algorithmically determined threshold value, converting, by one or more processors, the consolidated summary to one or more sentences using an extractive text summarization algorithm;

applying, by one or more processors, speaker diarisation;

ranking, by one or more processors, the one or more sentences based on a third set of factors; and retaining, by one or more processors, a subset of the one or more sentences that rank above a second threshold value that is based on a second pre-set user preference or a second machine-driven recommendation.

9. The computer-implemented method of claim 8 further comprising:

subsequent to retaining the subset of the one or more sentences that rank above the second threshold value that is based on the second pre-set user preference or the second machine-driven recommendation, identifying, by one or more processors, one or more keywords in the subset of the one or more sentences;

assigning, by one or more processors, a weightage to the one or more keywords in the subset of the one or more sentences based on the one or more keywords relatedness to the one or more topics of the virtual meeting and based on the one or more keywords relatedness to the at least two participants of the virtual meeting; and tagging, by one or more processors, the subset of the one or more sentences with the one or more keywords.

10. The computer-implemented method of claim 9 further comprising:

subsequent to tagging the subset of the one or more sentences with the one or more keywords, preparing, by one or more processors, a global ranking incorporating the at least two participants, the one or more keywords, and the subset of the one or more sentences; and preparing, by one or more processors, the summary tailored to a profile of the user based on the global ranking.

11. The computer-implemented method of claim 8, wherein applying speaker diarisation further comprises:

finding, by one or more processors, a point of change between the at least two participants in the plurality of audio frames; and grouping, by one or more processors, together a segment of speech based on a characteristic of the at least two participants.

12. The computer-implemented method of claim 8, wherein the third set of factors includes the role of the at least two participants of the virtual meeting and the relatedness of the one or more sentences to the one or more topics of the virtual meeting.

13. The computer-implemented method of claim 7, wherein the algorithmically determined threshold value is dynamic and is set in line with a training data set.

14. The computer-implemented method of claim 7, wherein the second set of factors includes whether the frames contain a name of the user who was disengaged from the virtual meeting, whether the ranking of the at least two participants, the relatedness of the two or more participants to the user who disengaged from the virtual meeting, based on the technology interest of the user, based on the domain expertise of the user, or based on historical analysis.

15. The computer-implemented method of claim 5, wherein the first set of factors includes a role of the at least two participants in the virtual meeting, the role of the at least two participants in a corporation, and the relatedness of the at least two participants to the user who disengaged from the virtual meeting.

16. The computer-implemented method of claim 1, wherein the first set of data regarding the user, the second set of data regarding the at least two participants of the virtual meeting, and the third set of data regarding the relationship between the user and the at least two participants of the virtual meeting collected from the database include a profile created by the user; a corporate profile of the user; a calendar of the user; one or more profiles created by the at least two participants of the virtual meeting; the corporate profile of the at least two participants of the virtual meeting; the calendar of the at least two participants of the virtual meeting; one or more presentation tools used by the at least two participants of the virtual meeting; and data from one or more prior virtual meetings the user hosted, participated in, or attended.

17. The computer-implemented method of claim 1, wherein detecting the user reconnecting to the virtual meeting further comprises:
    capturing, by one or more processors, the time during the virtual meeting when the user reconnected; and
    calculating, by one or more processors, a total duration of time the user was disengaged from the virtual meeting.

18. The computer-implemented method of claim 1, wherein the set of default user preferences to review the summary include a language preference, a viewing mode preference, an audio preference, and a subtitles preference.

19. A computer program product, embodied on a non-transitory computer-readable medium, comprising instructions which are executable by processing circuity to cause the processing circuitry to:
    detect a user disengaging from a virtual meeting having at least two participants for a pre-set period of time or for a pre-set percentage of a total allotted time of a pre-scheduled virtual meeting;
    collect a first set of data regarding the user, a second set of data regarding the at least two participants of the virtual meeting, and a third set of data regarding a relationship between the user and the at least two participants of the virtual meeting from a database;
    prepare a summary that is tailored to a profile of the user and that covers a portion of the virtual meeting during which the user was disengaged;
    detect the user reconnecting to the virtual meeting;
    determine whether the user will review the summary before rejoining the virtual meeting based on a pre-set user preference, a decision made by the user, or a machine-driven recommendation;
    responsive to determining the user will review the summary before rejoining the virtual meeting, prompt the user with a set of default user preferences to review the summary;
    output the summary to the user; and
    subsequent to outputting the summary to the user, compare the summary to a replay of a full recording of the virtual meeting.

20. A computer system comprising:
    one or more processors;
    one or more computer readable storage media;
    program instructions collectively stored on the one or more computer readable storage media for execution by at least one of the one or more computer processors, the stored program instructions comprising:
    program instructions to detect a user disengaging from a virtual meeting having at least two participants for a pre-set period of time or for a pre-set percentage of a total allotted time of a pre-scheduled virtual meeting;
    program instructions to collect a first set of data regarding the user, a second set of data regarding the at least two participants of the virtual meeting, and a third set of data regarding a relationship between the user and the at least two participants of the virtual meeting from a database;
    program instructions to prepare a summary that is tailored to a profile of the user and that covers a portion of the virtual meeting during which the user was disengaged;
    program instructions to detect the user reconnecting to the virtual meeting;
    program instructions to determine whether the user will review the summary before rejoining the virtual meeting based on a pre-set user preference, a decision made by the user, or a machine-driven recommendation;
    responsive to determining the user will review the summary before rejoining the virtual meeting, program instructions to prompt the user with a set of default user preferences to review the summary;
    program instructions to output the summary to the user; and
    subsequent to outputting the summary to the user, program instructions to compare the summary to a replay of a full recording of the virtual meeting.

\* \* \* \* \*